(12) United States Patent
Tu et al.

(10) Patent No.: US 12,420,661 B2
(45) Date of Patent: Sep. 23, 2025

(54) ENERGY MANAGEMENT METHOD AND TERMINAL DEVICE FOR ELECTRIC VEHICLE, AND STORAGE MEDIUM

(71) Applicant: Xiamen Yaxon Zhilian Technology Co., Ltd., Fujian (CN)

(72) Inventors: Yankai Tu, Fujian (CN); Yuan Chen, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 388 days.

(21) Appl. No.: 18/005,629

(22) PCT Filed: Aug. 18, 2020

(86) PCT No.: PCT/CN2020/109662
§ 371 (c)(1),
(2) Date: Jan. 16, 2023

(87) PCT Pub. No.: WO2022/011770
PCT Pub. Date: Jan. 20, 2022

(65) Prior Publication Data
US 2023/0271528 A1 Aug. 31, 2023

(30) Foreign Application Priority Data
Jul. 15, 2020 (CN) .......................... 202010681808.6

(51) Int. Cl.
*B60L 58/12* (2019.01)
(52) U.S. Cl.
CPC ........... *B60L 58/12* (2019.02); *B60L 2240/62* (2013.01); *B60L 2260/44* (2013.01); *B60L 2260/52* (2013.01); *B60L 2260/54* (2013.01)
(58) Field of Classification Search
CPC .......... B60L 58/15; B60L 58/14; B60L 58/13; B60L 58/12; B60L 50/40; B60L 50/60;
(Continued)

(56) References Cited

U.S. PATENT DOCUMENTS 11,981,319 B2 * 5/2024 Koti .................... B60W 40/105
2016/0308361 A1 10/2016 Zhao et al.
(Continued)

FOREIGN PATENT DOCUMENTS

| CN | 105416077 A | 3/2016 |
| CN | 106564398 A | 4/2017 |

(Continued)

OTHER PUBLICATIONS

International Search Report cited in PCT/CN2020/109662 mailed Apr. 19, 2021, 6 pages.

(Continued)

*Primary Examiner* — Wade Miles
*Assistant Examiner* — Zachary Joseph Wallace
(74) *Attorney, Agent, or Firm* — Cooper Legal Group, LLC

(57) ABSTRACT

The present invention relates to an energy management method and terminal device for an electric vehicle, and a storage medium. The method includes: calculating a predictive dynamic threshold in real time according to electronic horizon data, and setting an energy output/recovery proportion of a battery and a supercapacitor of the electric vehicle according to the predictive dynamic threshold. According to the present invention, the road ahead is predicted based on the electronic horizon system, and the predictive dynamic logic threshold is generated according to the electronic horizon information, thereby overcoming the defect that the conventional fixed logic threshold is incapable of predictive optimal energy management. A corresponding energy management strategy is set for predictive energy management according to the predictive dynamic logic threshold, thereby playing a positive role in reducing energy consumption of the electric vehicle, preventing battery loss, improving vehicle economy, etc.

5 Claims, 1 Drawing Sheet

```
┌─────────────────────────────────────────────────────┐
│ Calculate a predictive dynamic threshold in real    │
│ time according to electronic horizon data           │
└─────────────────────────────────────────────────────┘
                          │
                          ▼
┌─────────────────────────────────────────────────────┐
│ Set an energy output/recovery proportion of a       │
│ battery and a supercapacitor of an electric vehicle │
│ according to the predictive dynamic threshold       │
└─────────────────────────────────────────────────────┘
```

(58) Field of Classification Search
CPC ............. B60L 2260/54; B60L 2260/52; B60L 2260/44; B60L 2260/62; Y02T 10/70; B60W 2240/642
See application file for complete search history.

(56) References Cited

U.S. PATENT DOCUMENTS

| | | | |
|---|---|---|---|
| 2022/0067850 A1* | 3/2022 | Bhasme | .............. H02J 7/00716 |
| 2023/0139003 A1* | 5/2023 | Bhasme | ................. B60L 58/16 |
| | | | 701/533 |

FOREIGN PATENT DOCUMENTS

| | | |
|---|---|---|
| CN | 109552110 A | 4/2019 |
| CN | 110696635 A | 1/2020 |
| CN | 111196167 A | 5/2020 |

OTHER PUBLICATIONS

Written Opinion cited in PCT/CN2020/109662 mailed Apr. 19, 2021, 3 pages.

* cited by examiner

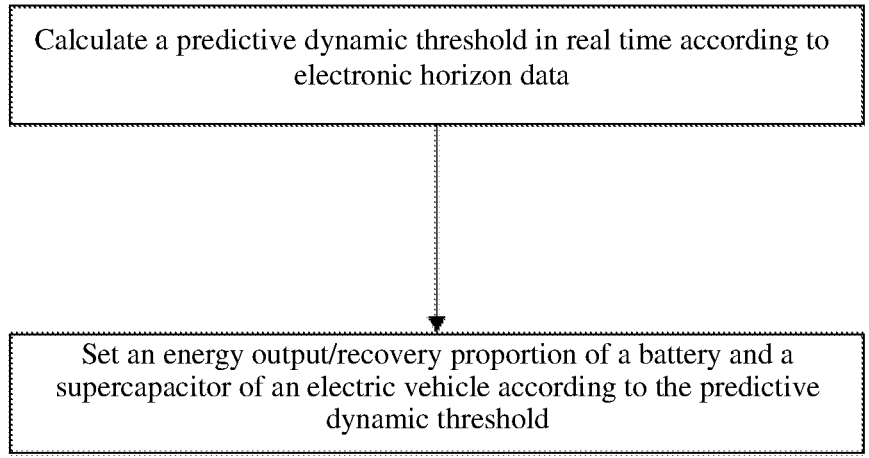

ENERGY MANAGEMENT METHOD AND TERMINAL DEVICE FOR ELECTRIC VEHICLE, AND STORAGE MEDIUM

TECHNICAL FIELD

The present invention relates to the field of energy management, and in particular to an energy management method and terminal device for an electric vehicle, and a storage medium.

BACKGROUND

An energy system of a modern pure electric vehicle typically includes a battery and a supercapacitor. Energy management is required for the energy system, such that power output of the battery and the supercapacitor is reasonably distributed to satisfy the power required for vehicle running. Moreover, with this energy management, it is also expected to make full use of the characteristics and advantages of the battery and the supercapacitor, prolong the service life of the battery as much as possible, and reduce the energy loss. The general principle is to make full use of the advantage of instantaneous high-power charge and discharge of the supercapacitor, avoid the impact of instantaneous high-current discharge on the lithium battery when the vehicle accelerates, and prolong the life of the battery. When the vehicle requires low power, the vehicle is powered only by the battery. When the vehicle requires high power, the basic power is supplied by the battery, and the rest power is supplied by the supercapacitor. When the vehicle is braked, high-power energy is first recovered by the supercapacitor with high charging efficiency, which can avoid damaging the battery by high-current charging. After the supercapacitor is fully charged, the energy is recovered by the battery.

The most common energy management method is an energy management strategy based on logic threshold rules, in which a series of vehicle running parameters and the logic threshold PL of power output or recovery are set, and the energy management strategy in selected according to different working states of the vehicle. However, in the existing management strategy, only the current power demand of the vehicle is considered, but there is no prediction of the future power demand. In this case, the current energy management may be reasonable under current conditions, but not optimal in future running. The existing management strategy cannot make adjustment in energy management in time according to the possible change of road conditions ahead, which is not conductive to more efficiently reducing the energy consumption of the electric vehicle and preventing battery loss.

SUMMARY

In order to solve the above problems, the present invention provides an energy management method and terminal device for an electric vehicle, and a storage medium.

The specific solutions are as follows:

Provided is an energy management method for an electric vehicle, including: calculating a predictive dynamic threshold in real time according to electronic horizon data, and setting an energy output/recovery proportion of a battery and a supercapacitor of the electric vehicle according to the predictive dynamic threshold.

Further, the predictive dynamic threshold is calculated based on an average gradient of a road ahead, a distance between a current position of the vehicle and a slope, and a fixed logic threshold.

Further, a calculation formula of the predictive dynamic threshold $P'_L$ is:

$$P'_L = P_L\left[A + \frac{1}{1 + e^{-\left[u\left(\frac{M}{D}-1\right)\tan\left(\frac{\pi}{10}S\right)\right]}}\right]$$

where S represents an average gradient of a road ahead of a current position of the vehicle, D represents a distance between the current position of the vehicle and a slope, $P_L$ represents a fixed logic threshold, A and M are constants, A is used to determine a fluctuation range of a dynamic threshold, M represents a distance threshold between the current position of the vehicle and the slope, and u is a step function.

Further, A is ½.

Further, a specific process of setting the energy output/recovery proportion of the battery and the supercapacitor of the electric vehicle according to the predictive dynamic threshold includes:

obtaining power $P_n$ required by vehicle running at the current moment according to an accelerator depth and a current speed of vehicle, acquiring a battery level BSOC and a supercapacitor level USOC at the current moment, and making the following determination:

when $P_n<0$ and USOC>$USOC_H$, setting a battery power $P_b=P_n$ and a supercapacitor power $P_c=0$;

when $P_n<0$ and USOC≤$USOC_H$, setting the battery power $P_b=0$ and the supercapacitor power $P_c=P_n$;

when $0≤P_n<P'_L$, USOC>$USOC_L$ and BSOC>$BSOC_L$, setting the battery power $P_b=P_n$ and the supercapacitor power $P_c=0$;

when $P_n>P'_L$, USOC>$USOC_L$ and BSOC>$BSOC_L$, setting the battery power $P_b=P'_L$ and the supercapacitor power $P_c=P_n-P'_L$;

when $P_n>0$, USOC≤$USOC_L$ and BSOC>$BSOC_L$, setting the battery power $P_b=P_n$ and the supercapacitor power $P_c=0$;

when $P_n>0$, USOC>$USOC_L$ and BSOC≤$BSOC_L$, setting the battery power $P_b=0$ and the supercapacitor power $P_c=P_n$; and when $P_n>0$, USOC≤$USOC_L$ and BSOC≤$BSOC_L$, setting the battery power $P_b=0$ and the supercapacitor power $P_c=0$;

where $USOC_H$ and $USOC_L$ respectively represent an upper limit and a lower limit of an SOC level of the supercapacitor, and $BSOC_L$ represents a lower limit of an SOC level of the lithium battery.

Provided is an energy management terminal device for an electric vehicle, including a processor, a memory, and a computer program stored in the memory and running in the processor. The processor, when executing the computer program, implements the steps in the method in the embodiments of the present invention.

Provided is a computer-readable storage medium storing a computer program. The computer program, when executed by a processor, implements the steps in the method in the embodiments of the present invention.

According to the technical solutions of the present invention, the terrain ahead is predicted based on the electronic horizon system, and the predictive dynamic logic threshold is generated according to the electronic horizon information, thereby overcoming the defect that the conventional fixed logic threshold is incapable of predictive optimal energy management. A corresponding energy management strategy is set for predictive energy management according to the predictive dynamic logic threshold, thereby playing a positive role in reducing energy consumption of the electric vehicle, preventing battery loss, improving vehicle economy, etc.

BRIEF DESCRIPTION OF DRAWINGS

FIG. 1 shows a flowchart of Embodiment I of the present invention.

DESCRIPTION OF EMBODIMENTS

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment I

This embodiment of the present invention provides an energy management method for an electric vehicle. As shown in FIG. 1, the method includes: calculating a predictive dynamic threshold in real time according to electronic horizon data, and setting an energy output/recovery proportion of a battery and a supercapacitor of the electric vehicle according to the predictive dynamic threshold.

In this embodiment, the predictive dynamic threshold is generated according to the electronic horizon data, thereby overcoming the defect that the conventional fixed logic threshold is incapable of predictive optimal energy management, and optimizing the energy management. Therefore, the energy is distributed between the battery and the supercapacitor more reasonably, which improves the energy utilization efficiency of the entire vehicle and protects the service life of the battery.

Different from the conventional fixed logic threshold, the predictive dynamic threshold is not a fixed value, but a function output value that changes constantly with the terrain ahead. In this embodiment, the predictive dynamic threshold is calculated based on an average gradient of a road ahead, a distance between a current position of the vehicle and a slope, and a fixed logic threshold. The average gradient of the road ahead and the current position of the vehicle are acquired according to the electronic horizon data. A specific calculation formula of the predictive dynamic threshold is:

$$P'_L = P_L \left[ A + \frac{1}{1 + e^{-\left[u\left(\frac{M}{D}-1\right)\tan\left(\frac{\pi}{10}S\right)\right]}} \right]$$

where $P'_L$ represents the predictive dynamic threshold, S represents the average gradient of the terrain ahead of the current position of the vehicle, D represents the distance between the current position of the vehicle and a slope, $P_L$ represents the fixed logic threshold, A and M are constants, and u is a step function.

The parameters will be described below.

The constant M represents a distance threshold between the current position of the vehicle and the slope. The electronic horizon system can predict the gradient of the road ahead. If the distance to the slope in the road ahead is too long, the impact on the energy distribution of the vehicle at the current moment will be negligible. Therefore, the constant M is set, indicating that the predictive dynamic logic threshold starts to change with the terrain ahead only when the distance between the slope and the vehicle is within M meters (typically 500, which can be adjusted according to the specific conditions of the vehicle, for example, the value may be larger for a vehicle assembled with a high-capacity supercapacitor, and may be smaller for a vehicle assembled with a low-capacity supercapacitor).

The step function u is $$u(x) = \begin{cases} 1, & x \geq 0 \\ 0, & x < 0 \end{cases}.$$

As can be seen, when the actual distance D between the current position of the vehicle and the slope is greater than M, the value of the function $$u\left(\frac{M}{D} - 1\right) \text{ is } 0,$$

and the dynamic threshold of the formula is $$P'_L = P_L \left[ A + \frac{1}{1 + e^{-0}} \right] = P_L.$$

This indicates that when the distance between the current position of the vehicle and the slope is more than M, the original default fixed logic threshold is used.

When the distance D between the current position of the vehicle and the slope is less than or equal to M, the value of $$u\left(\frac{M}{D} - 1\right) \text{ is } 1.$$

At this time, the predictive dynamic logic threshold is correlated with the gradient of the road ahead. Since a too large gradient may make the vehicle go beyond its limit performance and the energy management may lose its meaning, an upper limit and a lower limit associated with the gradient may be set: the upper limit is a 5° slope (defaulting to 5° for slopes greater than 5°), and the lower limit is a −5° slope (defaulting to −5° for slopes less than −5°). As can be seen from the formula, when the gradient of the road ahead is 0 (i.e., when the road is flat), $$P'_L = P_L \left[ A + \frac{1}{1 + e^{-0}} \right] = P_L,$$

i.e., there is no gradient in the road ahead, the original default fixed logic threshold is used.

The constant A determines the fluctuation range of the dynamic threshold. This constant can be set according to actual needs by those skilled in the art. In this embodiment, this constant is preferably set to ½.

When the gradient of the road ahead is the 5° slope (upper limit), $$P'_L = P_L\left[\frac{1}{2} + \frac{1}{1+e^{-\infty}}\right] = 1.5P_L,$$

i.e., there is a steep uphill slope ahead, then the predictive dynamic logic threshold is 1.5 times the default fixed logic threshold. The increase in the threshold means that more power is output by the battery and the power of the supercapacitor is temporarily reserved. When the vehicle runs to an uphill slope having a large gradient, the vehicle needs higher power output, and then, the supercapacitor outputs high power. This can prevent premature output of the supercapacitor power. In this case, when the vehicle runs to the steep slope ahead and needs high-power discharge, the power has to be output by the battery. Such passive high-power discharge may affect the service life of the battery. Therefore, with the calculation formula in this embodiment, the threshold can be dynamically increased according to the uphill slope ahead, thereby reducing the probability of high-power discharge of the battery and protecting the battery.

When the gradient ahead is the −5° slope (lower limit), $$P'_L = P_L\left[\frac{1}{2} + \frac{1}{1+e^{+\infty}}\right] = 0.5P_L,$$

i.e., there is a steep downhill slope ahead, the predictive dynamic logic threshold is half of the default fixed logic threshold. The decrease in the threshold means that more power is output by the supercapacitor. When the vehicle runs to a downhill slope having a large gradient ahead, more energy can be recovered because of braking at the steep downhill slope. The supercapacitor outputs more power before the slope, it has more space to recover braking energy, thereby obtaining better energy economy. The supercapacitor recovers more energy at the downhill road, which can also prevent frequent charging of the battery from affecting the battery life. Therefore, with the calculation formula in this embodiment, the threshold can be dynamically decreased according to the downhill slope ahead, thereby improving the energy recovery efficiency and protecting the battery from frequent charging and discharging.

Here, the predictive dynamic logic threshold and beneficial effects thereof are illustrated in the case that the gradient ahead is the value of the interval boundary. It is apparent that when the gradient ahead is within the interval (−5, 5), the predictive dynamic logic threshold also changes reasonably according to the terrain ahead.

A specific process of setting the energy output/recovery proportion of the battery and the supercapacitor of the electric vehicle according to the predictive dynamic threshold includes:

obtaining power $P_n$ required by vehicle running at the current moment according to an accelerator depth and a current speed of vehicle during the running process, acquiring a battery level BSOC and a supercapacitor level USOC at the current moment, and making the following determination:

When $P_n<0$ and $USOC>USOC_H$, a battery power $P_b=P_n$ and a supercapacitor power $P_c=0$ are set. This indicates that when the current power demand is negative (the energy is being recovered) and the supercapacitor is fully charged, the lithium battery receives the energy and is charged.

When $P_n<0$ and $USOC\leq USOC_H$, the battery power $P_b=0$ and the supercapacitor power $P_c=P_n$ are set. This indicates that when the current power demand is negative (the energy is being recovered) and the supercapacitor is not fully charged, the supercapacitor receives the energy and is charged.

When $0\leq P_n\leq P'_L$, $USOC>USOC_L$ and $BSOC>BSOC_L$, the battery power $P_b=P_n$ and the supercapacitor power $P_c=0$ are set. This indicates that when the current power demand is less than or equal to the predictive dynamic logic threshold and is positive, and when the SOC level of neither the battery nor the supercapacitor is low to the protection value such that the supercapacitor is incapable of outputting power, the battery supplies power to drive the vehicle.

When $P_n>P'_L$, $USOC>USOC_L$ and $BSOC>BSOC_L$, the battery power $P_b=P'_L$ and the supercapacitor power $P_c=P_n-P'_L$ are set. This indicates that when the current power demand exceeds the predictive dynamic logic threshold, and when the SOC level of neither the battery nor the supercapacitor is low to the protection value, the basic power demand $P'_L$ for driving the vehicle is supplied by the battery, and the rest power $P_n-P'_L$ for driving the vehicle is supplied by the supercapacitor.

When $P_n>0$, $USOC<USOC_L$ and $BSOC>BSOC_L$, the battery power $P_b=P_n$ and the supercapacitor power $P_c=0$ are set. This indicates that when the current power demand is positive and the supercapacitor is at a low SOC level and incapable of output power, the power is output by the battery.

When $P_n>0$, $USOC>USOC_L$ and $BSOC\leq BSOC_L$, the battery power $P_b=0$ and the supercapacitor power $P_c=P_n$ are set. This indicates that when the current power demand is positive and the battery is at a low SOC level and incapable of output power, the power is output by the supercapacitor.

When $P_n>0$, $USOC\leq USOC_L$ and $BSOC\leq BSOC_L$, the battery power $P_b=0$ and the supercapacitor power $P_c=0$ are set. This indicates that when the SOC levels of both the battery and the supercapacitor are less than their respective SOC protection values, no power is output.

$USOC_H$ and $USOC_L$ respectively represent an upper limit and a lower limit of an SOC level of the supercapacitor, and $BSOC_L$ represents the lower limit of the SOC level of the lithium battery. The lithium battery has its own overcharge protection mechanism, so the upper limit of the SOC level of the lithium battery is not considered here.

According to Embodiment of the present invention, the terrain ahead is predicted based on the electronic horizon system, and the predictive dynamic logic threshold is generated according to the electronic horizon information, thereby overcoming the defect that the conventional fixed logic threshold is incapable of predictive optimal energy management. A corresponding energy management strategy is set for predictive energy management according to the predictive dynamic logic threshold, thereby playing a positive role in reducing energy consumption of the electric vehicle, preventing battery loss, improving vehicle economy, etc.

Embodiment II

The present invention further provides an energy management terminal device for an electric vehicle, including a memory, a processor, and a computer program stored in the memory and capable of running in the processor. The processor, when executing the computer program, implements the steps in the method embodiment in Embodiment I of the present invention.

Further, as a feasible implementation, the energy management terminal device for an electric vehicle may be an on-board computer, a cloud server or other computing devices. The energy management terminal device for an electric vehicle may include, but not limited to, a processor and a memory. It can be understood by those skilled in the art that the composition of the energy management terminal device for an electric vehicle is merely an example of the energy management terminal device for an electric vehicle, and does not constitute a limitation to the energy management terminal device for an electric vehicle. The energy management terminal device for an electric vehicle may include more or less components than the above, or a combination of some components, or different components. For example, the energy management terminal device for an electric vehicle may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the energy management terminal device for an electric vehicle, and connects all parts of the entire energy management terminal device for an electric vehicle using various interfaces and lines.

The memory can be used for storing the computer program and/or module. The processor implements various functions of the energy management terminal device for an electric vehicle by running or executing the computer program and/or module stored in the memory and calling the data stored in the memory. The memory may mainly include a program storage area and a data storage area. The program storage area may store an operating system and application programs required by at least one function. The data storage area may store data created according to the use of a mobile phone, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the energy management terminal device for an electric vehicle is implemented in the form of a software functional unit and sold or used as an independent product, it can be stored in a computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. An energy management method for an electric vehicle, comprising:

calculating, by an on-board computer or a cloud server comprising a processor, a memory, and a computer program stored in the memory and capable of running in the processor, a predictive dynamic threshold in real time according to electronic horizon data; and setting, by the on-board computer or the cloud server, an energy output/recovery proportion of a battery and a supercapacitor of the electric vehicle according to the predictive dynamic threshold;

wherein the predictive dynamic threshold is calculated based on an average gradient of a road ahead, a distance between a current position of the electric vehicle and a slope, and a fixed logic threshold;

wherein setting the energy output/recovery proportion of the battery and the supercapacitor of the electric vehicle according to the predictive dynamic threshold comprises:

obtaining power ($P_n$) required by the electric vehicle running at a current moment according to an accelerator depth and a current speed of the electric vehicle;

acquiring a battery level (BSOC) and a supercapacitor level (USOC) at the current moment, and making the following determination:

when $P_n<0$ and $USOC>USOC_H$, setting a battery power $P_b=P_n$ and a supercapacitor power $P_c=0$;

when $P_n<0$ and $USOC \leq USOC_H$, setting the battery power $P_b=0$ and the supercapacitor power $P_c=P_n$;

when $0 \leq P_n \leq P'_L$, $USOC>USOC_L$ and $BSOC>BSOC_L$, setting the battery power $P_b=P_n$ and the supercapacitor power $P_c=0$;

when $P_n>P'_L$, $USOC>USOC_L$ and $BSOC>BSOC_L$, setting the battery power $P_b=P'_L$ and the supercapacitor power $P_c=P_n-P'_L$, where $P'_L$ is the predictive dynamic threshold;

when $P_n>0$, $USOC \leq USOC_L$ and $BSOC>BSOC_L$, setting the battery power $P_b=P_n$ and the supercapacitor power $P_c=0$;

when $P_n>0$, $USOC>USOC_L$ and $BSOC \leq BSOC_L$, setting the battery power $P_b=0$ and the supercapacitor power $P_c=P_n$; and when $P_n>0$, $USOC \leq USOC_L$ and $BSOC \leq BSOC_L$, setting the battery power $P_b=0$ and the supercapacitor power $P_c=0$; and wherein $USOC_H$ and $USOC_L$ respectively represent an upper limit and a lower limit of a state of charge (SOC)

level of the supercapacitor, and $BSOC_L$ represents a lower limit of a SOC level of the battery.

2. The energy management method for an electric vehicle according to claim 1, wherein a calculation formula of the predictive dynamic threshold ($P'_L$) is:

$$P'_L = P_L \left[ A + \frac{1}{1 + e^{-\left[u\left(\frac{M}{D}-1\right)\tan\left(\frac{\pi}{10}S\right)\right]}} \right]$$

wherein S represents an average gradient of the road ahead of the current position of the electric vehicle, D represents the distance between the current position of the electric vehicle and the slope, $P_L$ represents the fixed logic threshold, A is used to determine a fluctuation range of a dynamic threshold, M represents a distance threshold between the current position of the electric vehicle and the slope, and u is a step function.

3. The energy management method for an electric vehicle according to claim 2, wherein A is ½.

4. An energy management terminal device for the electric vehicle, comprising the processor, the memory, and the computer program stored in the memory and running in the processor, wherein the processor, when executing the computer program, implements the method according to claim 1.

5. A non-transitory computer-readable storage medium having the computer program stored thereon, wherein the computer program, when executed by the processor, implements the method according to claim 1.

* * * * *